United States Patent
Kim et al.

(10) Patent No.: US 7,235,327 B2
(45) Date of Patent: Jun. 26, 2007

(54) SAFETY VENT PART AND ELECTRIC ENERGY STORAGE DEVICE HAVING THE SAME

(75) Inventors: Sung-Min Kim, Yongin-si (KR); Yong-Ho Jung, Suwon-si (KR); Sung-Chul Park, Suwon-si (KR); Eun-Sil Kim, Suwon-si (KR)

(73) Assignee: Ness Capacitor Co., Ltd. (KR)

( * ) Notice: Subject to any disclaimer, the term of this patent is extended or adjusted under 35 U.S.C. 154(b) by 549 days.

(21) Appl. No.: 10/873,090

(22) Filed: Jun. 22, 2004

(65) Prior Publication Data

US 2005/0282064 A1    Dec. 22, 2005

(51) Int. Cl.
*H01M 2/12* (2006.01)
*F24F 7/00* (2006.01)

(52) U.S. Cl. ........................................ 429/56; 454/339

(58) Field of Classification Search ................ 429/53, 429/54, 55, 56, 82, 89; 454/339
See application file for complete search history.

*Primary Examiner*—Patrick Joseph Ryan
*Assistant Examiner*—Thomas H. Parsons
(74) *Attorney, Agent, or Firm*—Cantor Colburn LLP

(57) ABSTRACT

In a safety vent part and an electric energy storage device having the same, the safety vent part includes a plate coupled to the device, a metal sheet and a metal cap. A hole having a step portion is formed through the plate, and is in communication with an interior of the device. The metal cap having an exhaust nozzle corresponding the hole is coupled into the step portion by a tight fit. The metal sheet is disposed between a bottom surface of the step portion and the metal cap. When an internal pressure of the device is higher than a predetermined breaking pressure, the internal pressure of the device breaks the metal sheet. A gas generated abnormally in the device is exhausted through the hole and exhaust nozzle.

5 Claims, 2 Drawing Sheets

SAFETY VENT PART AND ELECTRIC ENERGY STORAGE DEVICE HAVING THE SAME

FIELD OF THE INVENTION

The present invention relates to a safety vent part and an electric energy storage device having the same, and more particularly, to a safety vent part for preventing a physical and chemical system like in an electric energy storage device from exploding by means of an internal pressure of the system increased abnormally and an electric energy storage device having the same.

DESCRIPTION OF THE RELATED ART

When the physical and chemical system is operated abnormally, a gas is generated by an abnormal reaction between internal materials, wherein an internal pressure of the system is gradually increased, and an explosion of the system may be resulted by the rise of internal pressure.

A safety vent part is installed on a portion of the system in order to prevent the explosion of the system. The safety vent part is broken at a predetermined breaking pressure lower than an explosion pressure of the system so that a gas generated abnormally in the system is exhausted through the broken safety vent part, and thus the explosion of the system may be prevented.

When the system explodes at a high internal pressure, the system is broken into fragments, and damage caused by the fragments may be generated. The damage is preventable with operation of the safety vent part. The safety vent part may be employed in various fields including the electric energy storage device, such as a secondary battery, a capacity or the like.

A conventional safety vent part may be accomplished by forming a recess in a case of the system or by thinning a portion of a case of the system so that the recess or the thinned portion is broken at the predetermined breaking pressure.

When the predetermined breaking pressure is from about 10 atm to about 30 atm, the safety vent part having a thickness thinner than about 0.1 mm is preferable. However, when the case has a thickness thicker than a number of millimeters, it is difficult to process the recess or the thinned portion in the case. In addition, damage of the system caused by the process may be generated during formation of the recess or the thinned portion.

Furthermore, the conventional safety vent part may be accomplished by welding a metal sheet to a case of the system so as to cover a hole after forming the hole through the case. The metal is preferably designed so as to be broken at the predetermined breaking pressure.

The metal sheet may be welded to the case with various welding methods, such as a resistance welding method, a laser beam welding method, a electron beam welding method or the like, in accordance with a material of the metal sheet. A high-priced welding method, such as the laser beam welding method and the electron beam welding method, is preferably used for welding the thin metal sheet to the case.

The welding method needs a processing area larger than a size of the safety vent part. Accordingly, when a size of the system is very small, it is difficult to secure the processing area sufficiently. In addition, the metal sheet may be damaged during welding process because the metal sheet is directly welded to the case of the system. Thus, there is a limit to thickness of the metal sheet based on an installation area of the safety vent part.

SUMMARY OF THE INVENTION

According to embodiments of the present invention, a safety vent part that has a small installation area and is easily installed to an electric energy storage device may be provided.

According to one embodiment of the present invention, a safety vent part preferably includes a plate, a metal sheet and a metal cap.

A hole is formed through the plate, and has a step portion extended downwardly from an upper surface of the plate. Also, the hole is in communication with an interior of a physical and chemical system, such as an electric energy storage device, and the step portion has a diameter greater than that of the hole.

The metal sheet is disposed on a bottom surface of the step portion.

The metal cap is coupled into the step portion by a tight fit, and has an exhaust nozzle corresponding to the hole of the plate. The metal sheet is disposed between the bottom surface of the step portion and a lower surface of the metal cap. At that time, the exhaust nozzle of the metal cap is coaxially disposed with the hole of the plate.

An annular groove is formed at the bottom surface of the step portion. A seal ring, such as an O-ring, is disposed in the annular groove in order to provide a seal between the metal sheet and the interior of the system. The annular groove is concentrically formed with the hole of the plate.

The electric energy storage, for example, such as a secondary battery, a capacity or the like, may include an electrode assembly and a case. The electrode assembly preferably includes an anode, a cathode and a separator disposed between the anode and the cathode. The case receives the electrode assembly and an electrolytic solution so that the electrode assembly is immersed in the electrolytic solution.

The safety vent part is preferably coupled to the case with various methods, for example, a welding method, in order to exhaust a gas generated abnormally in the case. At that time, the hole of the plate is in communication with an interior of the case, and an internal pressure of the case is applied to the metal sheet.

When the internal pressure of the case is higher than a predetermined breaking pressure, the internal pressure of the case breaks the metal sheet, and thus the gas generated abnormally in the system is exhausted through the hole of the plate and through the exhaust nozzle of the metal cap. Accordingly, explosion of the electric energy storage device is prevented because the predetermined breaking pressure is lower than an explosion pressure of the electric energy storage device.

As described above, the metal sheet is disposed between the bottom surface of the step portion and the metal cap. As a result, it is possible that the safety vent part is easily installed to a small physical and chemical system, and the metal sheet having a thickness thinner than decades of micrometers may be employed in the safety vent part.

DETAILED DESCRIPTION OF EMBODIMENTS OF THE PRESENT INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
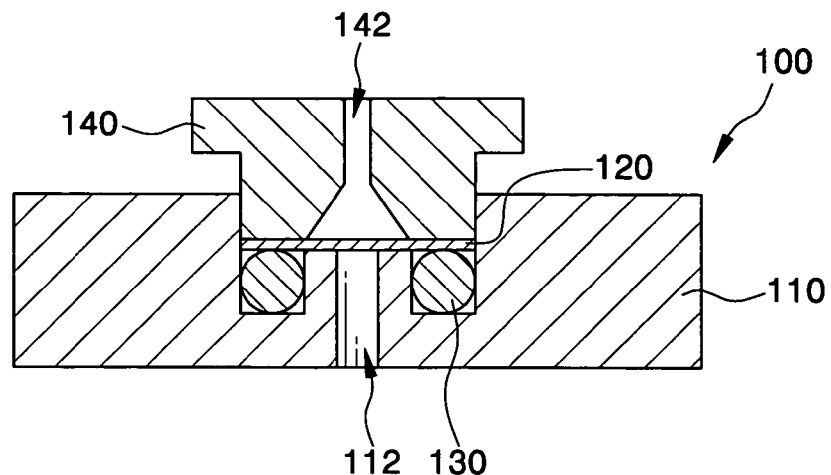
FIG. 1 is a cross-sectional view of a safety vent part according to one embodiment of the present invention.
Figure 2:
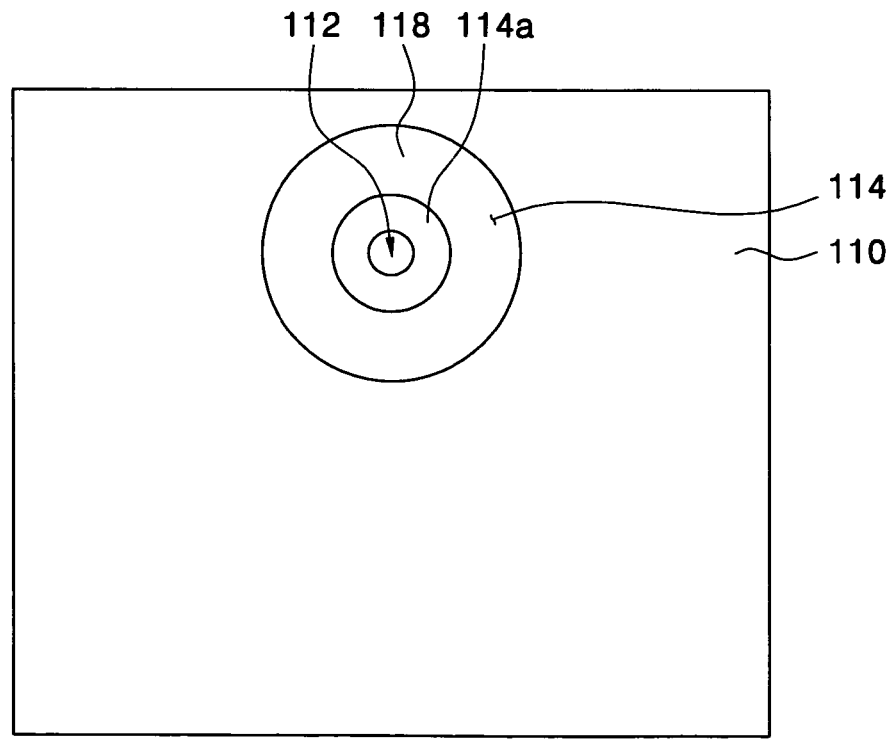
FIG. 2 is a plan view of a plate as shown in FIG. 1.
Figure 3:
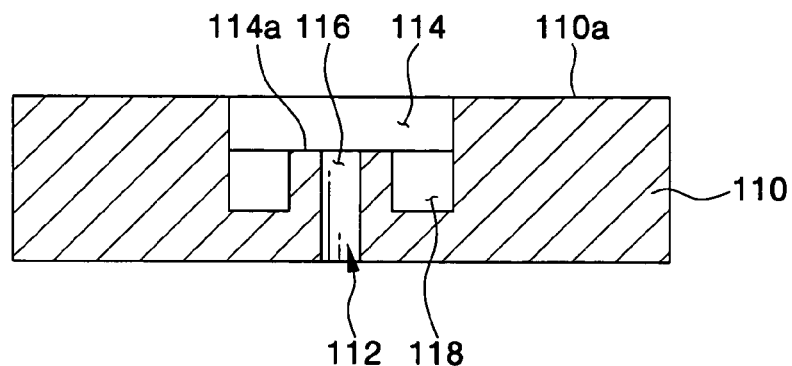
FIG. 3 is a cross-sectional view of a plate as shown in FIG. 1.

FIG. 1 is a cross-sectional view of a safety vent part according to one embodiment of the present invention, FIG. 2 is a plan view of a plate as shown in FIG. 1, and FIG. 3 is a cross-sectional view of a plate as shown in FIG. 1.

Referring to FIGS. 1 to 3, a safety vent part 100 preferably includes a plate 110, a metal sheet 120, a seal ring 130, and a metal cap 140.

The safety vent part 100 may be preferably employed in a physical and chemical system (not shown) such as an electric energy storage device. The electric energy storage device preferably includes an electrode assembly having an anode, a cathode, and a separator disposed between the anode and the cathode, and a case for receiving the electrode assembly and an electrolytic solution so that the electrode assembly is immersed in the electrolytic solution.

A circular hole 112 is formed through the plate 110, and it is in communication with an interior of the system. The circular hole 112 has a step portion 114 extended downwardly from an upper surface 110a of the plate 110. The step portion 114 has a diameter greater than a lower diameter of the circular hole 112, and it is concentrically formed with a lower portion 116 of the circular hole 112 of the plate 110.

The plate 110 is not only used as one sidewall of the case, but also mounted on one sidewall of the case by a welding method. When the plate 110 is mounted to the case, the case has a penetration hole corresponding to the circular hole 112.

An annular groove 118 is concentrically formed with the circular hole 112 of the plate 110 at a bottom surface 114a of the step portion 114. The seal ring 130, such as an O-ring, is disposed in the annular groove 118, and it has a cross-sectional area corresponding substantially to that of the annular groove 118.

The metal sheet 120 is disposed on the bottom surface 114a of the step portion 114 and the seal ring 130. The seal ring 130 provides a seal between the interior of the system and the metal sheet 120. The metal sheet 120 has a disc shape identical to cross-section of the step portion 114. An aluminum sheet is preferably used as the metal sheet 120, and a thickness of the metal sheet 120 may be determined in accordance with an internal pressure of the system.

The metal cap 140 is forced into the step portion 114 by a tight fit so that the metal sheet 120 is tightly in contact with the seal ring 130 disposed in the annular groove 118. The metal cap 140 has a circular cross-section identical to that of the step portion 114. When a diameter of the metal cap 140 is smaller than that of the step portion 114, the metal cap 140 cannot fix in the step portion 114. Accordingly, it is preferable that the diameter of the metal cap 140 is identical to or a little greater than that of the step portion 114.

The seal ring 130 disposed in the annular groove 118 provides the seal between the metal sheet 120 and the system. The internal pressure of the system is applied to a central portion of the metal sheet 120. When the internal pressure is higher than a predetermined breaking pressure, the metal sheet 120 is broken, thus a gas generated abnormally in the case of the system is exhausted through the circular hole 112 of the plate 110 and an exhaust nozzle 142 of the metal cap 140.

Meanwhile, when a cross-sectional shape of the seal ring 130 is excessively deformed by means of insertion of the metal cap 140 into the step portion 114, a pressure may be non-uniformly applied in downward from the metal cap 140 to the metal sheet 120. Consequently, the metal sheet 120 may not be broken at the predetermined breaking pressure. In contrast, when the cross-sectional shape of the seal ring 130 is not deformed, the seal ring 130 cannot provide the seal between the metal sheet 120 and the system. Accordingly, it is preferable that the seal ring 130 is suitably elected such that the seal ring 130 provides a sufficient seal between the metal sheet 120 and the system.

The above-mentioned the safety vent part 100 using the metal sheet 120 and the metal cap 140 can reduce an installation area as compared with the conventional safety vent part using a method of direct welding of a metal sheet. For example, when the plate 110 is used as one sidewall of the case, the safety vent part 100 may be easily installed at a localized portion of the plate 110. Besides, the plate 110 may be easily mounted to the case with the welding method.

When employing the conventional safety vent part using the method of direct welding of the metal sheet to the case, the metal sheet may be damaged by contact with an external structure or an external force. In contrast, the metal cap 140 protects the metal sheet 120 from the contact with the external structure or the external force. Accordingly, it is possible that the metal sheet 120 having a thickness thinner than decades of micrometers is employed in the safety vent part 100.

Figure 4:
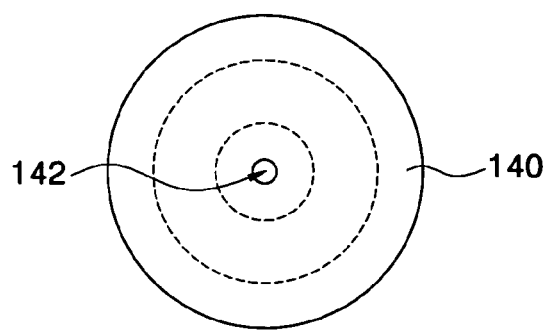
FIG. 4 is a plan view of a metal cap as shown in FIG. 1.
Figure 5:
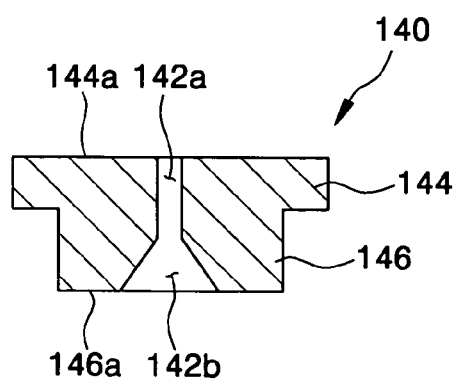
FIG. 5 is a cross-sectional view of a metal cap as shown in FIG. 1.

FIG. 4 is a plan view of the metal cap as shown in FIG. 1, and FIG. 5 is a cross-sectional view of the metal cap as shown in FIG. 1.

Referring to FIGS. 4 and 5, the metal cap 140 preferably includes an upper cylindrical section 144 having a disc shape, and a lower cylindrical section 146 that has a diameter smaller than that of the upper cylindrical section 144. The lower cylindrical section 146 is integrally formed with the upper cylindrical section 144. The exhaust nozzle 142 corresponding to the circular hole 112 of the plate 110 is formed along a central axis of the metal cap 140. When the lower cylindrical section 146 of the metal cap 140 is coupled into the step portion 114 of the plate 110 with the tight fit, the exhaust nozzle 142 of the metal cap 140 is coaxially located with the circular hole 112 of the plate 110. The metal sheet 120 is disposed between the exhaust nozzle 142 and the circular hole 112 of the plate 110.

The exhaust nozzle 142 preferably includes a first portion 142a extended from an upper surface 144a of the upper cylindrical section 144 downwardly and a second portion 142b extended from a lower surface 146a of the lower cylindrical section 146 upwardly. The first portion 142a has a fixed diameter, and the second portion 142b has a diameter gradually reduced toward the upper cylindrical section 144. That is, the first portion 142a is formed in a cylindrical shape, and the second portion 142b is formed in a tapered shape from the lower surface 146a of the lower cylindrical section 146. At that time, it is preferable that a minimum diameter of the second portion 142b is identical with the diameter of the first portion 142a, and a maximum diameter of the second portion 142b is greater than the lower diameter of the circular hole 112 of the plate 110.

When the gas is generated by an abnormal reaction between the electrode assembly and the electrolytic solution in the case of the system, the internal pressure of the system is increased. When the internal pressure is higher than the predetermined breaking pressure, the increased internal pressure breaks the metal sheet 120. At the same time, the gas is exhausted through the circular hole 112 of the plate 110 and through the exhaust nozzle 142 of the metal cap 140. As shown in figures, deformation and breakdown of the metal sheet 120 by means of the increased internal pressure may be easily accomplished because the maximum diameter of the second portion 142b of the exhaust nozzle 142 is greater than the lower diameter of the circular hole 112 of the plate 110.

The metal sheet 120 is broken before an explosion of the system because the predetermined breaking pressure of the metal sheet 120 is lower than an explosion pressure of the system. Accordingly, the safety vent part 100 may prevent the system from breaking into fragments and damage caused by the fragments. Furthermore, contamination due to the explosion of the system may be prevented.

In the drawings and specification, there have been disclosed typical preferred embodiments of the invention, and although specific terms are employed, they are used in a generic and descriptive sense only and not for purposes of limitation, the scope of the invention being set forth in the following claims.

What is claimed is:

1. A safety vent part comprising:
   a plate which a hole is formed therethrough, the hole having a step portion extended downwardly from an upper surface of the plate and being in communication with an interior of a physical and chemical system, and the step portion having a diameter greater than that of the hole;
   a metal sheet disposed on a bottom surface of the step portion; and
   a metal cap coupled into the step portion, the metal cap having an exhaust nozzle corresponding to the hole of the plate, and the metal sheet being disposed between the bottom surface of the step portion and a lower surface of the metal cap,
   wherein the metal sheet is broken by an internal pressure of the system when the internal pressure of the system is higher than a predetermined breaking pressure, and a gas in the system is exhausted through the hole of the plate and through the exhaust nozzle of the metal cap.

2. The safety vent part of claim 1, further comprising a seal ring for providing a seal between the metal sheet and the interior of the system, the seal ring being disposed in an annular groove formed at the bottom surface of the step portion.

3. The safety vent part of claim 2, where the exhaust nozzle includes a first section adjacent to an upper surface of the metal cap and having a cylindrical shape and a second section adjacent to a lower surface of the metal cap and formed in a taper configuration.

4. The safety vent part of claim 1, wherein the metal cap is coupled into the step portion by a tight fit.

5. An electric energy storage device comprising:
   an electrode assembly including an anode, a cathode and a separator disposed between the anode and the cathode;
   a case for receiving the electrode assembly and an electrolytic solution so that the electrode assembly is immersed in the electrolytic solution; and
   a safety vent part coupled to the case for exhausting a gas generated abnormally in the case,
   wherein the safety vent part includes:
   a plate which a hole is formed therethrough, the hole having a step portion extended downwardly from a upper surface of the plate and being in communication with an interior of the case, and the step portion having a diameter greater than that of the hole;
   a metal sheet disposed on a bottom surface of the step portion; and
   a metal cap coupled into the step portion, the metal cap having an exhaust nozzle corresponding the hole of the plate, and the metal sheet being disposed between the bottom surface of the step portion and a lower surface of the metal cap,
   wherein the metal sheet is broken by an internal pressure of the case when the internal pressure of the case is higher than a predetermined breaking pressure, and the gas in the case is exhausted through the hole of the plate and through the exhaust nozzle of the metal cap.

* * * * *